(12) United States Patent
Bellis

(10) Patent No.: US 11,164,023 B2
(45) Date of Patent: Nov. 2, 2021

(54) METHOD OF ENROLLING A NEW MEMBER TO A FACIAL IMAGE DATABASE

(71) Applicant: Innovative Technology Limited, Oldham (GB)

(72) Inventor: David Bellis, Oldham (GB)

(73) Assignee: Innovative Technology Limited, Oldham (GB)

( * ) Notice: Subject to any disclaimer, the term of this patent is extended or adjusted under 35 U.S.C. 154(b) by 0 days.

(21) Appl. No.: 16/894,942

(22) Filed: Jun. 8, 2020

(65) Prior Publication Data

US 2021/0049393 A1    Feb. 18, 2021

(30) Foreign Application Priority Data

Aug. 13, 2019  (GB) ..................................... 1911558

(51) Int. Cl.
*G06K 9/62* (2006.01)
*G06K 9/00* (2006.01)
*G10L 17/24* (2013.01)

(52) U.S. Cl.
CPC ..... *G06K 9/00926* (2013.01); *G06K 9/00228* (2013.01); *G06K 9/00288* (2013.01); *G06K 9/00335* (2013.01); *G10L 17/24* (2013.01)

(58) Field of Classification Search
CPC . G06K 9/00926; G06K 9/00221–2009/00328; G06K 9/00335–9/00355
See application file for complete search history.

(56) References Cited

U.S. PATENT DOCUMENTS 9,214,027  B2 * 12/2015  Sumi ....................... G06T 11/60
2017/0249095  A1 * 8/2017  Ricci .................. G06Q 30/0265
2019/0318155  A1 * 10/2019  Liu .................... G06K 9/00268

* cited by examiner

*Primary Examiner* — Brian Werner
(74) *Attorney, Agent, or Firm* — Woodard Emhardt Henry Reeves & Wagner LLP

(57) ABSTRACT

A method of entering a facial image of an individual into a database of recognised and authorised individuals, the method comprising the steps of: receiving, from an image capture device connected to a database processing device, an image of a scene; determining whether the image of the scene contains a facial image of a recognised and authorised first individual; determining whether the image of the scene contains a facial image of a second individual and, if the image of the scene contains a facial image of a second individual, determine if the second individual is a recognised and authorised individual; if the second individual is not a recognised and authorised individual, determine whether the image of the scene includes a security gesture by the recognised and authorised first individual; and entering the facial image of the second individual to the database of recognised and authorised individuals if the image of the scene includes the security gesture by the recognised and authorised first individual.

8 Claims, 3 Drawing Sheets

METHOD OF ENROLLING A NEW MEMBER TO A FACIAL IMAGE DATABASE

CROSS REFERENCE TO RELATED APPLICATION

This application claims the benefit of United Kingdom Application No. GB 1911558.3 filed Aug. 13, 2019.

BACKGROUND

The present invention generally relates to digital image collections, more particularly the present invention relates to the use of automatic face recognition within digital image collections and the addition of a new image to digital image collections. Facial recognition systems include digital image collections of recognised and authorised individuals in the form of an electronic database of facial images.

One conventional application that utilises a facial image database is a security system in which only individuals whose face is recognised by virtue of inclusion in the database are authorised to access a restricted area or perform a restricted activity. An example of such an application is a camera system located proximal to the entrance to a building or a secure area. Here, the camera system is directly linked to processing means that can access database information, and ingress by an individual into the building or secure area is only permitted when said individual is identified as an existing database member.

A problem exists with such systems in that adding unknown individuals to the database so that they can be identified as authorised users in the future generally requires an initial enrollment procedure that typically involves the oversight of an authorised individual. Such an enrollment procedure may require the new entrant to the database to be formally photographed by an authorised person who will then have to follow what might be a lengthy procedure to add the image of the new entrant to the database.

Another example of when a system utilising a facial image database is considered advantageous is where the age of an individual needs to be verified.

Conventionally, if the age of an individual needs to be verified in order that the purchase of age-restricted goods or services can be authorised, the individual in question will typically be asked to supply some form of identification to the operator of the point-of-sale terminal. The identification will typically be a driving license, passport or any other suitable documentation that provides some form of evidence as to the age of the individual in question.

However, some age verification systems can provide a false negative to the age of an individual. This can occur when, for example, the individual's age is very close to the restricted age limit, and the system is unable to make an accurate estimation. In this instance, a third-party operative, such as a shop employee, may be required to authorise that the individual is of a required age by inspecting documentary proof and then activating some form of system override in order that the individual may proceed with the restricted activity.

A problem exists with the above described age verification systems in that the same individual may provoke a false negative verification on numerous occasions at the same establishment, requiring repeated intervention by the shop employee.

SUMMARY

The present invention addresses the aforementioned problems associated with the above described systems.

According to an aspect of the present invention there is provided a method of entering a facial image of an individual into a database of recognised and authorised individuals, the method comprising the steps of: receiving, from an image capture device connected to a database processing device, an image of a scene; determining whether the image of the scene contains a facial image of a recognised and authorised first individual; determining whether the image of the scene contains a facial image of a second individual and, if the image of the scene contains a facial image of a second individual, determine if the second individual is a recognised and authorised individual; if the second individual is not a recognised and authorised individual, determine whether the image of the scene includes a security gesture by the recognised and authorised first individual; entering the facial image of the second individual to the database of recognised and authorised individuals if the image of the scene includes the security gesture by the recognised and authorised first individual.

Preferably, the security gesture comprises a hand gesture or wave, an eye wink, or a mouth movement.

Preferably, the method includes receiving, from an audio capture device, the voice of the recognised and authorised first individual containing information relating to the second individual.

Alternatively, the security gesture is a voice prompt received from the recognised and authorised first individual by the audio capture device.

Received audio information relating to the second individual may include the name of the second individual and/or the age of the second individual.

Preferably, the method includes providing an indication to the recognised and authorised first individual that the facial image of the second individual has been successfully added to the database. This indication may be a visual sign or an audio sign.

BRIEF DESCRIPTION OF THE DRAWINGS

An embodiment of the present invention will now be described, by way of example only, with reference to the accompanying schematic drawings, in which.

DETAILED DESCRIPTION

Figure 1:
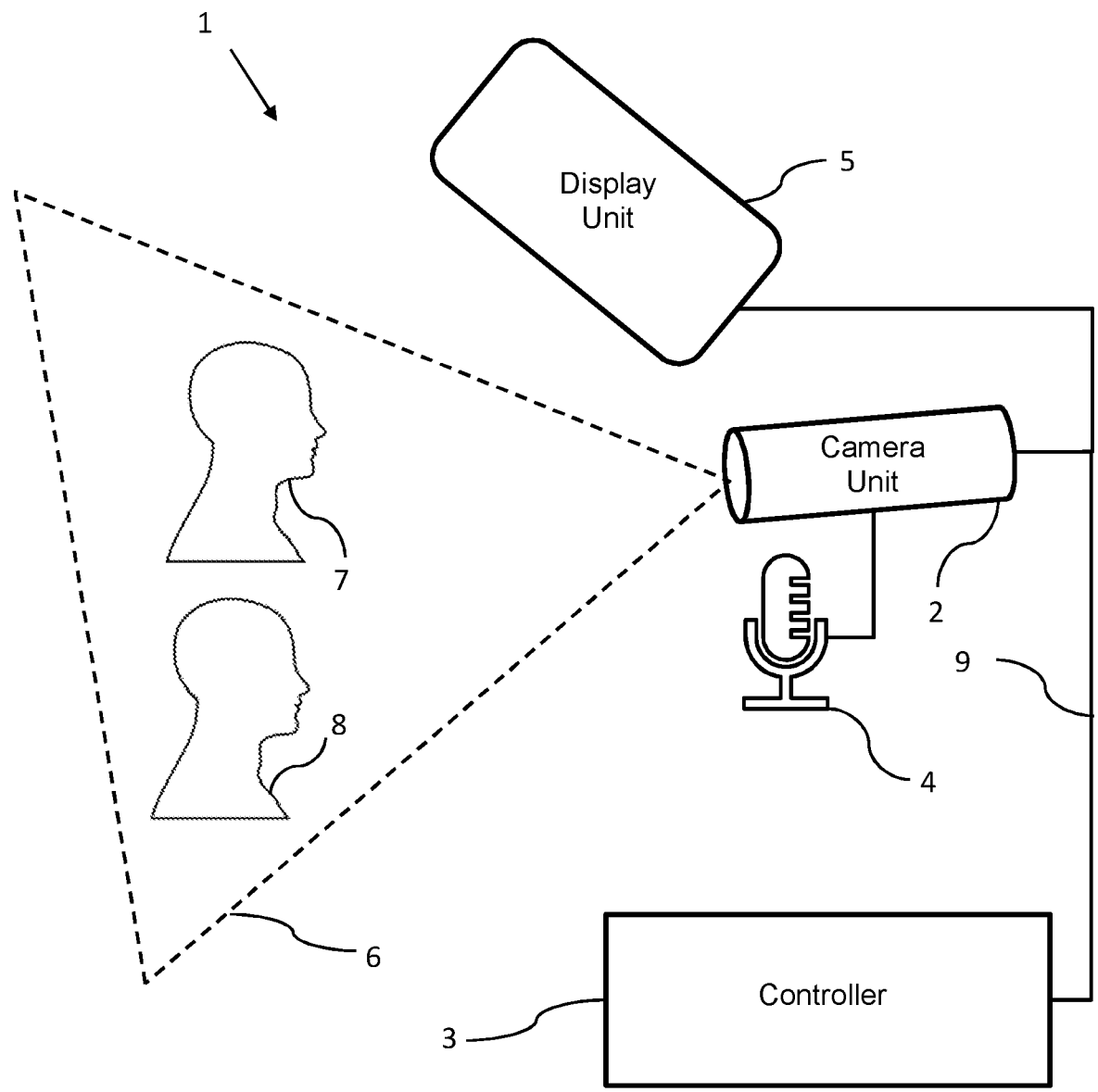
FIG. 1 shows a facial image recognition system.

With reference to FIG. 1, a facial image recognition system 1 comprises a camera unit 2 connected to a controller 3. The controller 3 may be located proximal to the camera unit 2, or it may be situated at a location remote from the camera unit 2. The camera unit 2 is connected to the controller 3 via a communications link 9. The communications link 9 may be a wired or wireless connection between the camera unit 2 and the controller 3. Alternatively, the communications link 9 may be part of a larger wired or wireless network. The controller 3 may be a computer or a network server that is configured to run dedicated control software for operation of the facial image recognition system 1.

The facial image recognition system 1 may include some optional components. For example, the facial recognition system 1 may include a display unit 5 for providing visual feedback to a user and/or to display a continuous image of the surveyed scene 6. The facial recognition system 1 may also employ an audio microphone 4 for receiving audio input from the surveyed scene 6. Typically, the audio input will be the voice of a user located within the surveyed scene 6. The audio microphone 4 may be linked to the camera unit 2 in any known manner. Alternatively, the audio microphone 4 may be integral to the camera unit 2 or integral to the display unit 5.

The surveyed scene 6 shown in FIG. 1 includes an individual 7. The individual 7 is a person that is known to the facial recognition system 1. That is to say, the individual 7 is a recognised and authorised person whose facial image is contained within a database of known and authorised individuals. The database of images of authorised people is contained within the controller 3.

The surveyed scene 6, which may be a lobby or an entrance area to a building, or it may be the immediate vicinity of a point-of-sale device in a retail establishment, includes a second individual 8 accompanying the known individual 7. The second individual 8 is a person that is unknown and not recognised by the facial recognition system 1 since the facial image of the second individual is not contained within the database of images in the controller 3.

The camera unit 2 obtains an image of the surveyed scene 6 and registers that the image of the surveyed scene 6 includes the face of the known individual 7 and identifies this person as an authorised individual. The controller 3 determines that the image of the surveyed scene 6 also includes the face of the unknown second individual 8.

The known individual 7, who wishes the facial recognition system 1 to enroll the second individual 8 into the database of images, indicates that the facial image of the second individual 8 is to be added to the database of images by performing a security gesture. The security gesture may be a wave or hand gesture, a wink, a mouth movement, or any predetermined security gesture known to the facial recognition system 1.

Alternatively, the security gesture may be an audio prompt or vocalisation issued by the known individual 7 which is received by the audio microphone 4. For example, the first individual 7 may say "authorise", "enroll", or any other predetermined security audio command. The reader should be aware that the security gesture may take any audio or physical form, and that the foregoing details only exemplary and illustrative security gestures.

In this way, the an authorised first individual 7 authorises the inclusion of the facial image of a second individual 8 into the database of known individuals. However, if the second individual 8 is not to be added, or if the second individual 8 is a bogus individual attempting to fraudulently enroll himself or herself in the system 1, this is prevented, since the first individual will not perform the security gesture.

Figure 2:
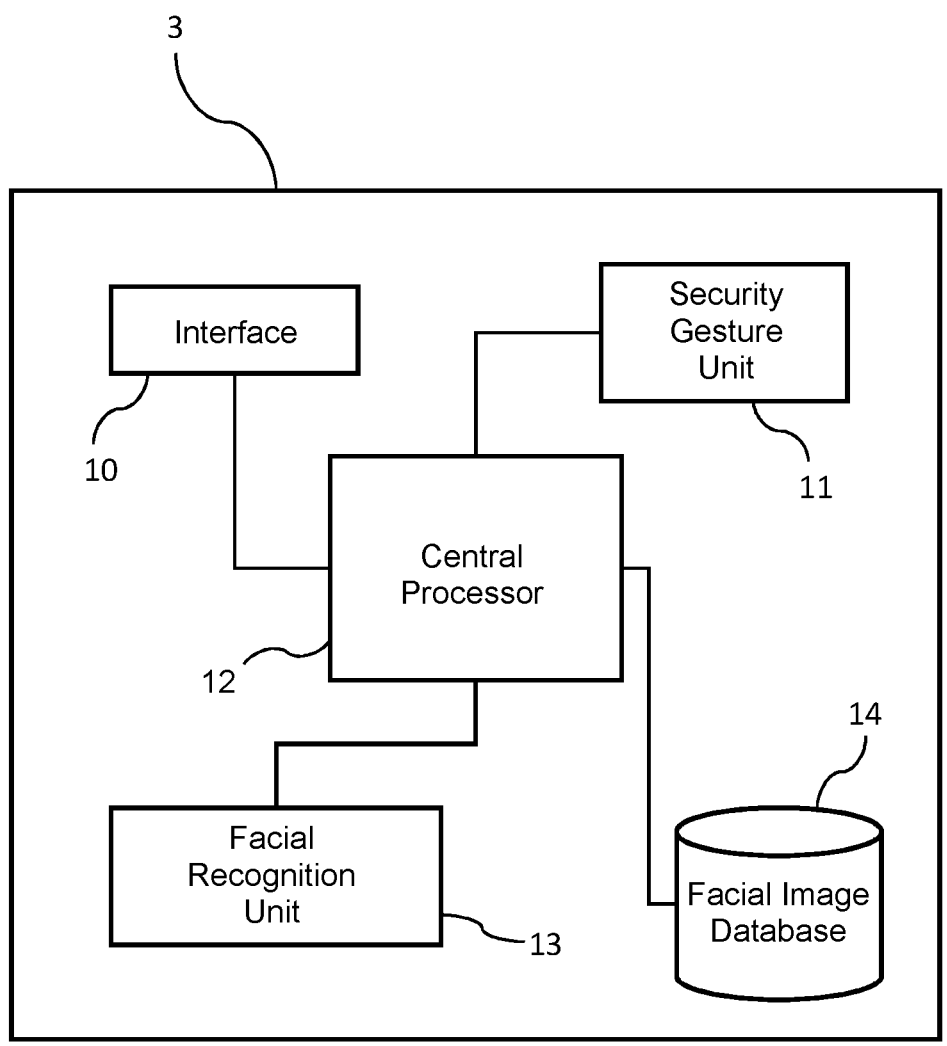
FIG. 2 shows a facial image recognition system controller.

With reference to FIG. 2, the controller 3 comprises a camera unit interface 10 which interconnects the camera unit 2 to a central processor 12. The processor 12 is connected to, and controls the operation of, a facial recognition unit 13. The facial recognition unit 13 incorporates facial recognition logic configured to locate facial images in the surveyed scene 6 captured by the camera unit 2.

If a facial image is located in the image, the facial recognition unit 13 is operable to determine whether the facial image is a facial image of a known individual 7 by instructing the processor 12 to interrogate a facial image database 14. If a facial image match is found in the facial image database 14, it is determined that the image contains an image of an authorised individual 7.

If the facial recognition unit 13 determines that the image of the surveyed scene 6 includes a facial image of an authorised individual 7, the facial recognition unit 13 then determines is the image of the surveyed scene 6 contains a facial image of a second individual 8.

If a facial image of a second individual 8 is located, and it has been determined that no match for the facial image of the second individual 8 has been found on the facial image database 14, the image containing the facial image of an authorised person is scanned by security gesture unit 11 to determine if the authorised person 7 has performed the predetermined security gesture.

The facial image of the second individual 8 is only added to the facial image database 14 if the security gesture unit 11 determines that the authorised individual 7 has performed the predetermined security gesture.

In another embodiment of the present invention, the authorised first individual 7 may, in addition to performing the security gesture, speak the name, or other personal information, of the second individual 8. The audio microphone 4 receives this audio input and voice recognition logic within the processor 12 associates the received details with the facial image of the second individual 8. The details relating to the individual, such as their name, age etc., is stored in the facial image database 14 along with the facial image of the second individual 8.

Once the second individual's facial image and personal details have been entered into the facial image database 14, a confirmatory message to this effect may be displayed on the display unit 5 to inform the authorised individual 7 that the enrollment process has been successfully completed. Alternatively, successful enrollment may be confirmed by the production of a sound alert.

Figure 3:
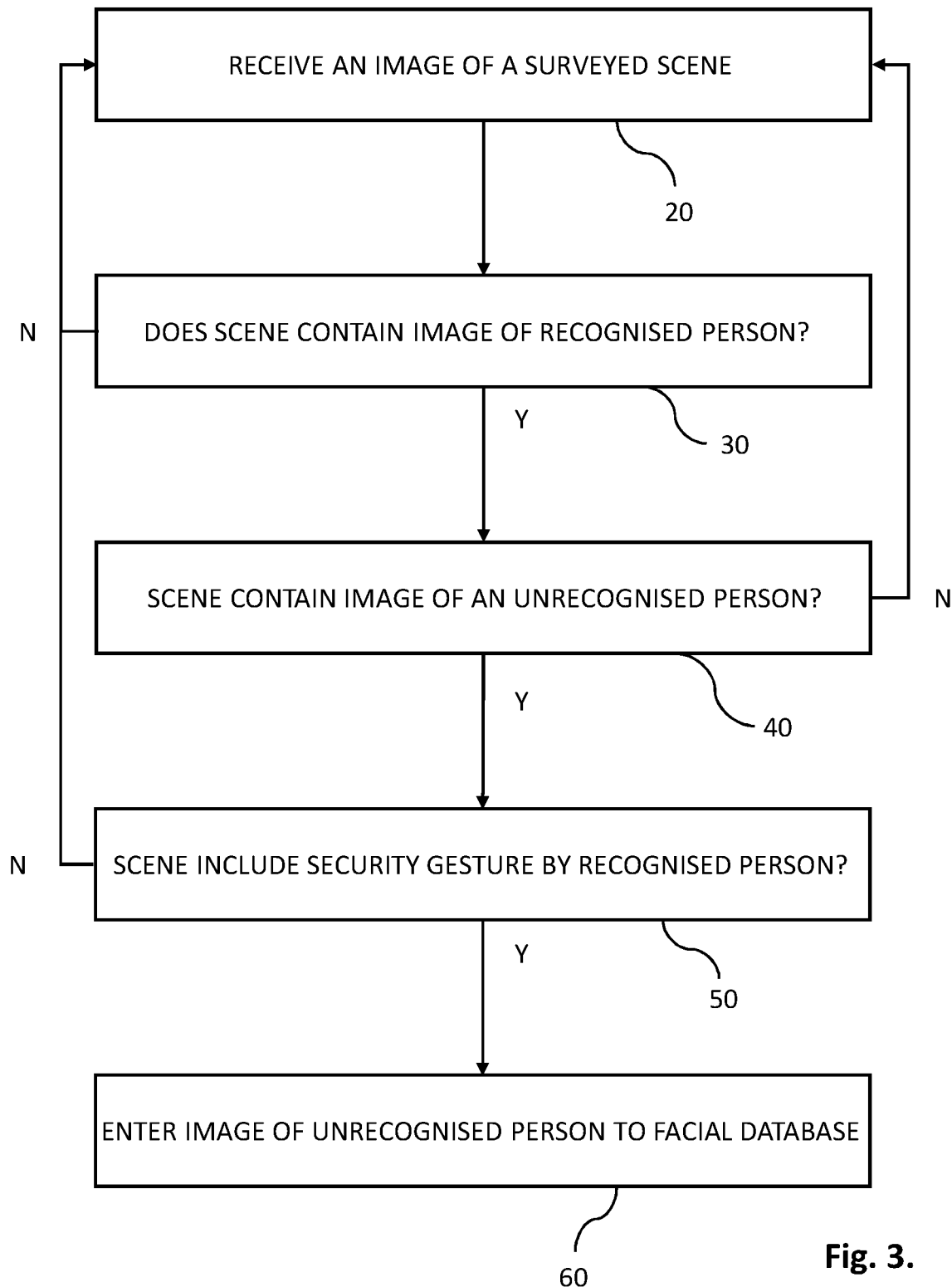
FIG. 3 shows a flowchart of a method of enrolling a new entrant into a facial image database.

FIG. 3 is a flowchart illustrating an example process that is executed by the controller 3. At step 20 the controller 3 receives an image of the surveyed scene 6 and, at step 30, the controller 3 determines whether the received image of the surveyed scene contains an image of person who is known to the system. The facial image of a person known to the system will be stored on the facial image database 14.

If it is determined at step 30 that the received image does not contain an image of a known person, the camera unit 2 continues to scan the surveyed scene. However, if at step 30 it is determined that the received image does contain the facial image of a known person, then step 40 is executed. Step 40 determines if the received image also includes the facial image of an unknown person.

If it is determined that the received image does not contain the facial image of an unknown person, then the camera unit 2 continues to scan the surveyed scene. If it is determined that the received image does contain the facial image of an unknown person, step 50 determines whether the received image includes an image of the known person performing the predetermined security gesture. If the image does include the predetermined security gesture, then, at step 60, the facial image of the unknown person is entered into the database of known facial images 14. If no security gesture is detected, the camera unit 2 continues to scan the surveyed scene for a facial image.

What is claimed is:
1. A method of entering a facial image of an individual into a database of recognised and authorised individuals, the method comprising the steps of:
receiving, from an image capture device connected to a database processing device, an image of a scene;

determining whether the image of the scene contains a facial image of a recognised and authorised first individual;

determining whether the image of the scene contains a facial image of a second individual and, if the image of the scene contains a facial image of a second individual, determine if the second individual is a recognised and authorised individual;

if the second individual is not a recognised and authorised individual, determine whether the image of the scene includes a security gesture by the recognised and authorised first individual; and entering the facial image of the second individual to the database of recognised and authorised individuals if the image of the scene includes the security gesture by the recognised and authorised first individual.

2. A method as claimed in claim 1, wherein the security gesture comprises one of the following: a hand gesture or wave; an eye wink; a mouth movement.

3. A method as claimed in claim 1, wherein the method includes receiving, from an audio capture device, the voice of the recognised and authorised first individual containing information relating to the second individual.

4. A method as claimed in claim 3, wherein the security gesture is a voice prompt received from the recognised and authorised first individual by the audio capture device.

5. A method as claimed in claim 3, wherein the information relating to the second individual includes the name of the second individual.

6. A method as claimed in claim 3, wherein the information relating to the second individual includes the age of the second individual.

7. A method as claimed in claim 1, wherein the method includes providing an indication to the recognised and authorised first individual that the facial image of the second individual has been successfully added to the database.

8. A method as claimed in claim 7, wherein the indication is a visual sign or an audio sign.

* * * * *